Oct. 5, 1965   J. F. DALTON   3,209,863
VARIABLE FORCE SPRING MOTOR

Filed May 7, 1964   3 Sheets-Sheet 1

INVENTOR.
JOHN F. DALTON
BY
ATTORNEYS

Oct. 5, 1965　　　　　J. F. DALTON　　　　　3,209,863
VARIABLE FORCE SPRING MOTOR
Filed May 7, 1964　　　　　　　　　　　　3 Sheets-Sheet 2
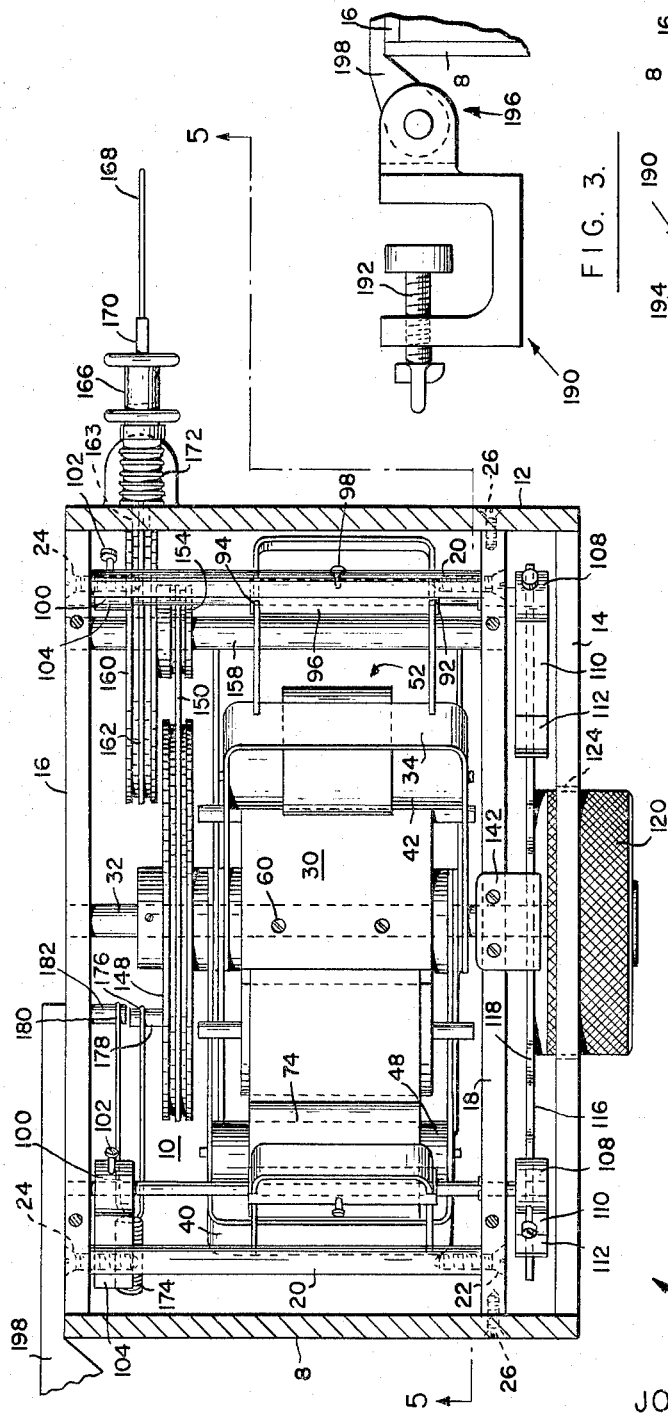
INVENTOR.
JOHN F. DALTON
BY
ATTORNEYS

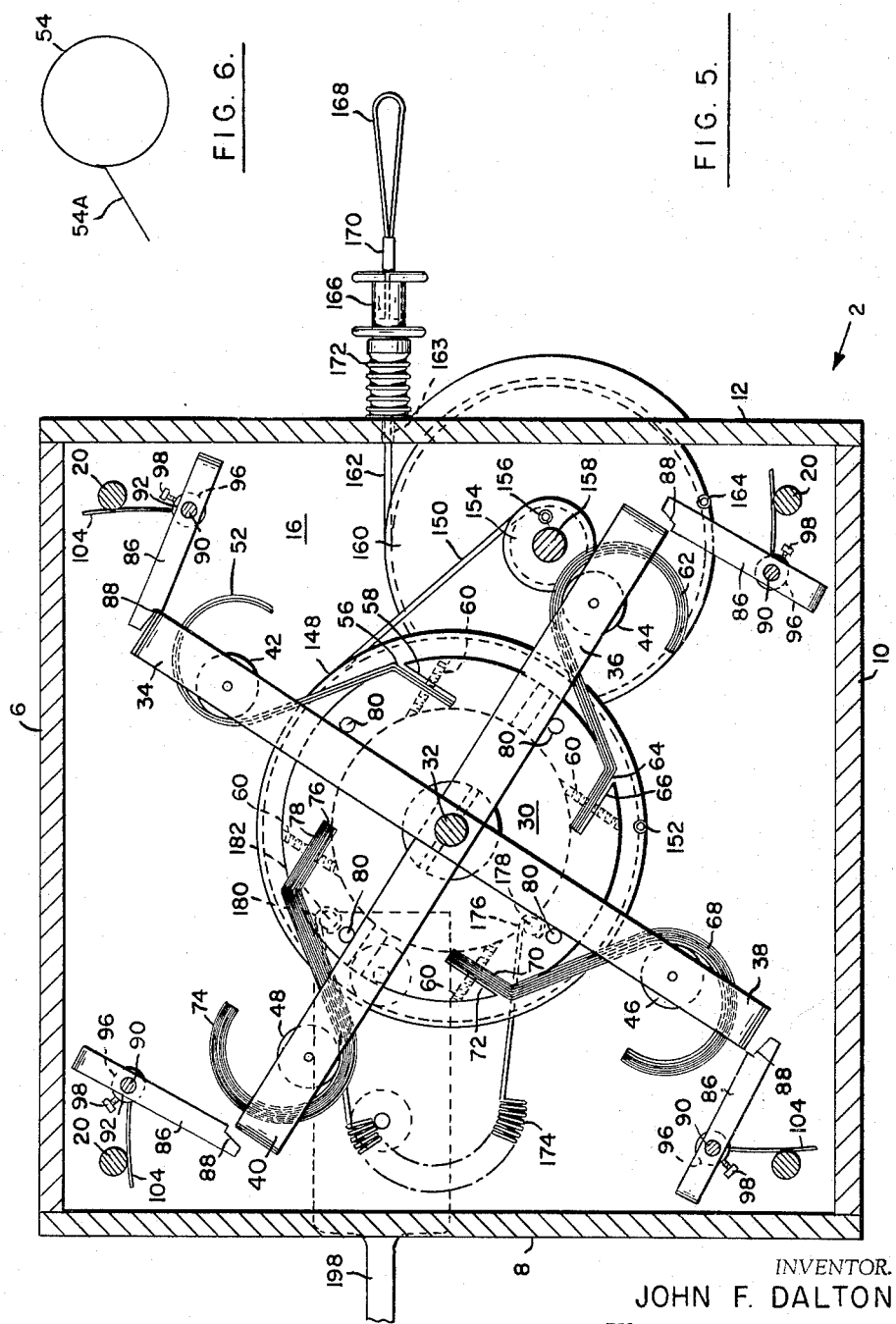

United States Patent Office 3,209,863
Patented Oct. 5, 1965

3,209,863
VARIABLE FORCE SPRING MOTOR
John F. Dalton, Springfield, Pa., assignor to Ametek, Inc., New York, N.Y., a corporation of Delaware
Filed May 7, 1964, Ser. No. 365,841
8 Claims. (Cl. 185—37)

This invention relates to a variable force spring motor.

In a large number of applications, it is desirable to have a spring motor which can produce a number of different forces in a short stroke range. Further, many applications require that these forces be relatively constant throughout the operating stroke. A typical such application is in the field of orthopedic tensioning where it is desired to stretch a patient's neck. In accordance with this invention, there is produced a highly advantageous spring motor suitable for these and other applications.

The invention and its objects will be fully clarified on reading the following description in conjunction with the drawings in which:

FIGURE 2 is a vertical section taken on the plane indicated by the line 2—2 in FIGURE 1;

FIGURE 3 is a side elevation partially broken away showing the clamp employed to secure the apparatus of FIGURE 1 to a supporting structure;

FIGURE 4 is a plan view of the clamp of FIGURE 3;

FIGURE 5 is a section taken on the plane indicated by the line 5—5 in FIGURE 2; and FIGURE 6 is a plan view of a lamina used to make the laminated strip coil springs employed in the motor of FIGURE 1.

Figure 1:
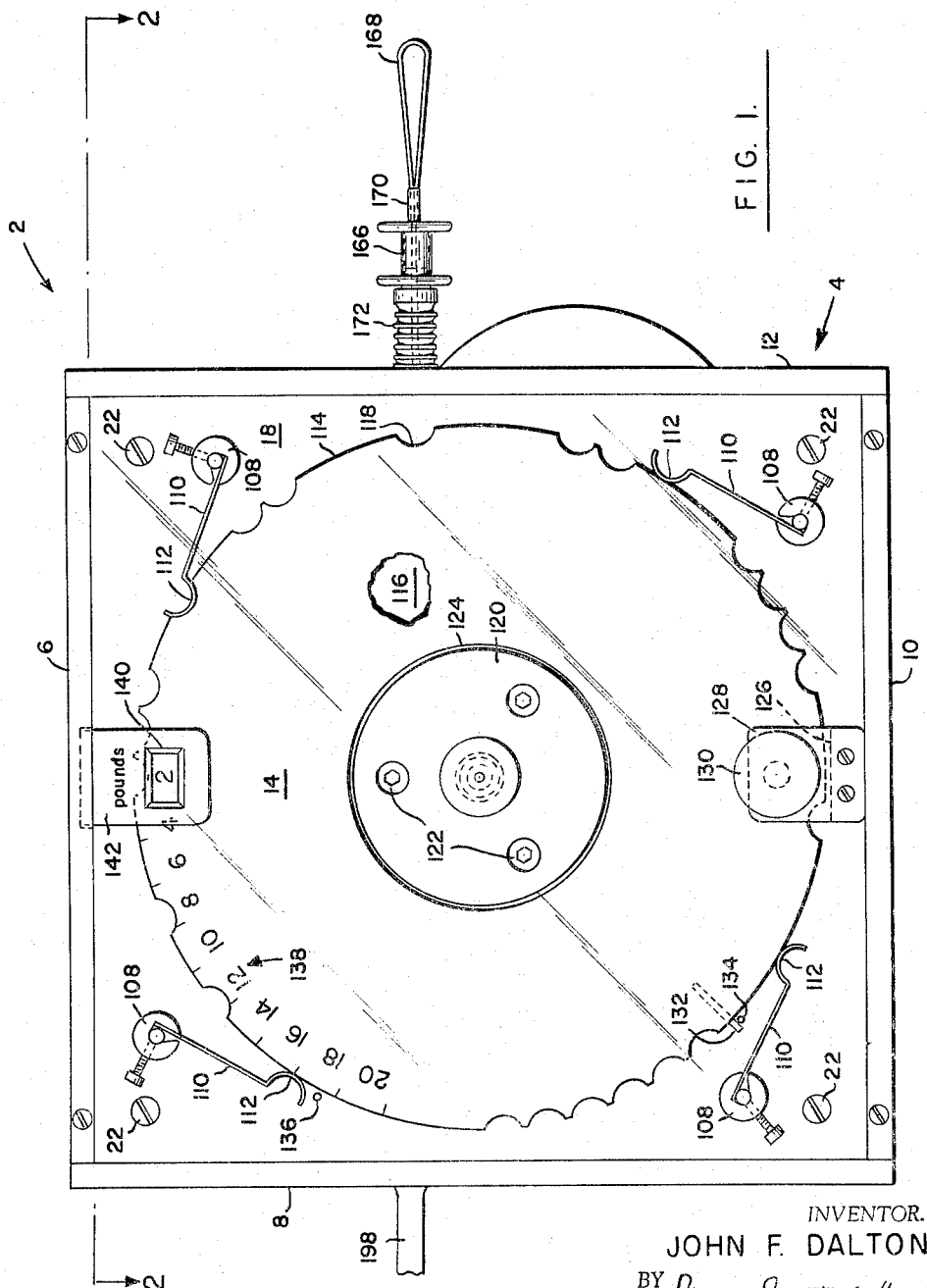
FIGURE 1 is a plan view of a spring motor in accordance with the invention.

Referring to the drawings, a spring motor 2 has a casing 4 having side walls 6, 8, 10 and 12, a transparent top wall 14 and a bottom wall 16. A plate 18 parallel to and spaced from top wall 14 is secured to posts 20 by screws 22 and posts 20 are in turn secured to bottom wall 16 by screws 24. Plate 18 is also secured to walls 6, 8, 10 and 12 by screws 26.

A solid cylindrical member 30 (drum) is fixedly secured to shaft 32 which is mounted for rotation in bottom wall 16 and plate 18. U-shaped members 34, 36, 38 and 40 are mounted for free rotation about shaft 32 and respectively carry rollers 42, 44, 46 and 48.

Roller 42 is engaged by a laminated strip coil spring set to a predetermined constant radius. Spring 52 has two laminas 54, 54 and a straightened end portion 56 secured in slot 58 in member 30 by screws 60. Spring 52 is of a well known type which is fully disclosed in United States Patent No. 3,047,280 issued July 31, 1962 and which is commercially available from the Hunter Spring Division of Ametek, Inc., Hatfield, Pennsylvania under the trademark "AW." In FIGURE 6, a lamina 54 and its straightened end portion 54A are shown at rest. Each lamina 54 as employed here will be considered for purposes of illustration to exert a constant force of one pound. Thus spring 52 will exert a force of two pounds.

Rollers 44, 46 and 48 are similarly engaged by laminated strip coil springs set to a predetermined constant radius and identical with spring 52 with the exception that additional laminas 54 are employed. Thus roller 44 is engaged by laminated strip coil spring 62 having four lamina 54 (exerting a force of 4 pounds) and having a straightened end portion 64 secured in a slot 66 in member 30 by screws 60. Roller 46 is engaged by laminated strip coil spring 68 which is made up of six laminas 54 (exerting a force of 6 pounds) and has a straightened end portion 70 engaged in slot 72 in member 30 and secured by screws 60. Roller 48 is engaged by laminated strip coil spring 74 which has eight lamina 54 (extering a force of 8 pounds) and a straightened end 76 engaged in a slot 78 in member 30 and secured by screws 60.

Springs 52, 62, 68 and 74 urge member 34, 36, 38 and 40 respectively clockwise as viewed in FIGURE 5, the rotation of each of these members being respectively limited by a stop pin 80 secured to member 30. The clockwise rotation of each of these members as viewed in FIGURE 5 can also selectively be stopped by a U-shaped stop member 86 provided with a cut-out portion 88. Each stop member 86 is mounted on a rod 90 and engages end slots 92 and 94 in a sleeve 96 fixably secured to shaft 90 by set screw 98. Each shaft 90 is mounted for rotation in bottom wall 16 and in plate 18. A collar 100 is secured to the lower end of each shaft 90 by means of a set screw 102 and carries a leaf spring 104 which engages the adjacent post 20 to act to bias shaft 90 in each case in a counterclockwise direction as viewed in FIGURE 5. The upper end of each shaft 90 has secured thereto a collar 108 which retains a spring feeler lever 110 having a rounded projection portion 112 which when engaging the outer periphery 114 of selector disc 116 acts to rotate shaft 90 clockwise as viewed in FIGURES 1 and 5 against the force of leaf spring 104. Selector disc 116 is provided with a plurality of cut out portions 118 for the reception of the projection portions 112 of levers 110. When a projection portion 112 enters a cut-out portion 118, the force of the associated leaf spring 104 acts to move shaft 90 counterclockwise as viewed in FIGURES 1 and 5 which in turn acts to position the associated stop 86 so as to be engaged by the associated U-shaped members 34, 36, 38 or 40.

Selector disc 116 is rotatably mounted on shaft 32 and is connected to a knob 120 by means of screws indicated at 122. Knob 120 passes through an opening 124 in front wall 14 and is rotatably mounted on shaft 32. Disc 116 passes through a slot 126 in member 128 which is secured to front wall 14. A clamp 130 passes through wall 14 and is threaded to member 128 and acts to clamp disc 116 in position when desired. A pin 132 secured by a pressed fit in disc 116 is adapted to engage stop members 134 and 136 secured by pressed fits in plate 18. A scale 138 on disc 116 cooperates with a window 140 in member 142 to indicate the force being exerted.

A pulley 148 is fixedly secured to shaft 32 and carries a cable 150 which is secured as indicated at 152 to pulley 148. Cable 150 is also connected to pulley 154 as indicated at 156. Pulley 154 is fixedly secured to shaft 158 which is mounted for rotation in bottom wall 16 and plate 18. A pulley 160 is fixedly secured to shaft 158 being integral with pulley 154 and carries a cable 162 secured to it as indicated at 164. Cable 162 passes through opening 163 in side wall 12 of casing 4 and carries a hand-hold fitting 166 adjacent the exterior end which is formed into a loop 168 which is secured by a clamp 170 and which is suitable for engagement with the apparatus to be connected to the motor, for example, a neck stretching harness. A rubber bellows stop member 172 is mounted on cable 162 between hand-hold member 166 and wall 12 and limits the winding up of cable 162 and hence the rotation of member 30.

A constant compression coil spring 174 which may be, for example, of the type disclosed in United States Re. 23,974 issued Apr. 5, 1955, has an end portion 176 secured to a pin 178 secured to a pulley 148 and an end portion 180 secured to a pin 182 mounted on bottom wall 16. Spring 174 is desirable since it acts to provide a positive return of cylindrical member 30 to the unwound position with stop member 172 bearing against wall 12.

By way of illustration, the motor 2 can be mounted if desired by a camp 190 (FIGURES 3 and 4) having two threaded clamping members 192 and 194 and being pivotally secured as indicated at 196 to an arm 198 secured to back wall 16.

OPERATION

In operation, knob 120 is employed to turn selector disc 116 so as to select the desired force. As shown in the drawings, disc 116 is set for a force of two pounds in which instance only the projection portion 112 of lever 110 associated with the stop member 86 adapted to engage U-shape member 34 is dropped into a cut-out portion 118 of disc 116. Thus, only this stop member engages its associated U-shaped member. With clamp 130 loosened, cable 162 is extended causing the clockwise rotation (as viewed in FIGURE 5) of pulleys 160 and 154 which in turn through cable 150 causes the clockwise rotation (as viewed in FIGURE 5) of pulley 148 and shaft 32. The consequent clockwise rotation of cylindrical member 30 causes the clockwise rotation of U-shaped members 34, 36, 38 and 40. This brings U-shaped member 34 into contact with its associated stop member 86 and consequently causes the arresting of its rotation. As cylindrical member 30 continues to rotate, it draws spring 52 around the guide roller 42 and reverse winds spring 52 onto its outer periphery. In this specific illustration, this will resut in a force output of two pounds. Since spring 52 is set to a constant radius, the output force will be constant throughout the limited stroke of the motor. It will be seen that drum 30 can be rotated approximatey 65°.

If it is desired to have the motor provide a larger force output, cylindrical member 30 is permitted to rotate counterclockwise as viewed in FIGURE 5, thus reeling in cable 162 until all the U-shaped members 34, 36, 38 and 40 are positioned sufficiently counterclockwise to be engaged by their respective stop members 86. Disc 116 is then rotated clockwise as viewed in FIGURE 1 to provide for any of the other possible force combinations for example, with only U-shaped member 36 engaged by its stop member 86 to provide a force of four pounds; with U-shaped members 34 and 36 engaged by their associated stop members 86 to provide a force of six pounds; with U-shaped members 34 and 38 engaged by their associated stop members 86 to provide a force of eight pounds; with U-shaped members 34 and 40 engaged by their associated stop members 86 to provide a force of ten pounds; with U-shaped members 36 and 40 engaged by their associated stop member 86 to provide a force of twelve pounds; with U-shaped members 38 and 40 engaged by stop members 86 to provide a force of fourteen pounds; with U-shaped members 34, 38 and 40 engaged by stop member 86 to provide a force of sixteen pounds; with U-shaped members 36, 38 and 40 engaged by stop members 86 to provide a force of eighteen pounds; and finally with all of the U-shaped members engaged by stop member 86 to provide a force of twenty pounds. It is desirable after moving the disc 116 to the desired force position to screw clamp 130 inwardly to clamp disc 116 in the set position.

While the above specific illustration of the invention employs four laminated strip coil springs all built up from a basic lamina 54 to provide a large number of different combination of forces, it will be appreciated that a wide variety of different springs may be employed. It is, of cocrse, possible to employ but a single lamina although a laminated spring is preferred to provide for larger forces. Obviously, also the lamina in the various springs need not be identical. Further, it should be pointed out that the springs need not be constant force springs but may have either negative or positive gradients if other than a constant force application is involved.

It will be understood that the above described embodiments is not intended to be limiting but rather a typical illustration of the invention.

What is claimed is:

1. A spring motor comprising a drum mounted for rotation about its axis,
    a plurality of members spaced from the drum, supporting means supporting each said member for rotation about the axis of the drum,
    a plurality of springs each extending between one member and the drum,
    means to rotate the drum,
    and selective stop means to selectively stop the rotation of selected members to cause the rotation of the drum to be opposed by any spring extending between a selected member and the drum.

2. A motor in accordance with claim 1 in which the selective stop means comprises a selector disc having selector openings,
    a plurality of feelers adapted to sense said openings,
    and a stop member connected to each feeler.

3. A spring motor in accordance with claim 1 in which each stop means is adapted to engage a supporting means and the motor has means to bias each supporting means in the direction away from the adjacent stop means when the motor is unwound.

4. A spring motor comprising a drum mounted for rotation about its axis,
    a plurality of members spaced from the drum, supporting means supporting each said member for rotation about the axis of the drum,
    a plurality of strip coil springs each set to a predetermined curvature and each bearing against one member and making at least a partial turn around the member,
    each said spring having one end secured to said drum,
    means to rotate the drum and selective stop means to selectively stop the rotation of selected members to cause the rotation of the drum to be opposed by any spring bearing against a selected member.

5. A spring motor in accordance with claim 4 having stop means connected to the drum to limit the rotation of each member in the direction it is urged by the spring bearing against it.

6. A spring motor in accordance with claim 4 in which each strip coil spring is set to a predetermined substantially constant curvature to exert a substantially constant force.

7. A spring motor in accordance with claim 4 in which the selective stop means comprises a selector disc having selector openings,
    a plurality of feelers adapted to sense said openings,
    and a stop member connected to each feeler.

8. A spring motor in accordance with claim 4 in which each stop means is adapted to engage a supporting means and the motor has means to bias each supporting means in the direction away from the adjacent stop means when the motor is unwound.

References Cited by the Examiner

UNITED STATES PATENTS

| 1,249,990 | 12/17 | Morden | 185—11 |
| 2,545,753 | 3/51 | Thomas | 185—37 |
| 2,596,819 | 5/52 | Murphy | 185—37 |

FOREIGN PATENTS

| 627,105 | 9/61 | Canada. |
| 555,829 | 4/23 | France. |

SAMUEL LEVINE, *Primary Examiner.*

EDGAR W. GEOGHEGAN, *Examiner.*

UNITED STATES PATENT OFFICE
CERTIFICATE OF CORRECTION

Patent No. 3,209,863 October 5, 1965

John F. Dalton

It is hereby certified that error appears in the above numbered patent requiring correction and that the said Letters Patent should read as corrected below.

Column 1, line 54, for '"AW"' read -- "RW" --; column 2, line 65, strike out "a", second occurrence; line 72, for "camp" read -- clamp --; column 3, line 26, for "resut" read -- result --; line 65, for "cocrse" read -- course --.

Signed and sealed this 13th day of December 1966.

(SEAL)
Attest:

ERNEST W. SWIDER
Attesting Officer

EDWARD J. BRENNER
Commissioner of Patents